A. B. LANDIS.
CHANGE SPEED GEARING.
APPLICATION FILED JULY 23, 1912. RENEWED MAY 14, 1918.
1,289,199.
Patented Dec. 31, 1918.
10 SHEETS—SHEET 4.
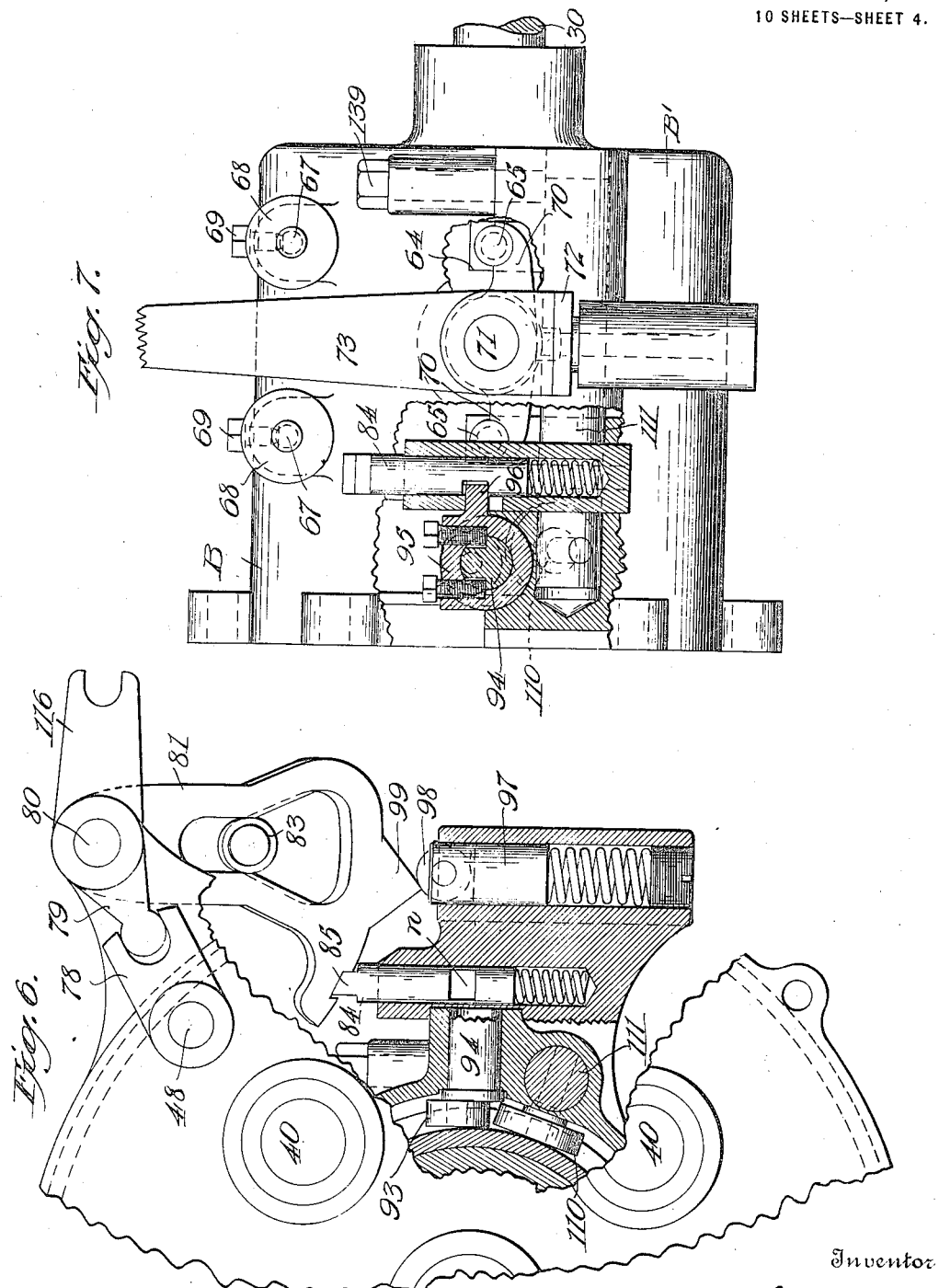

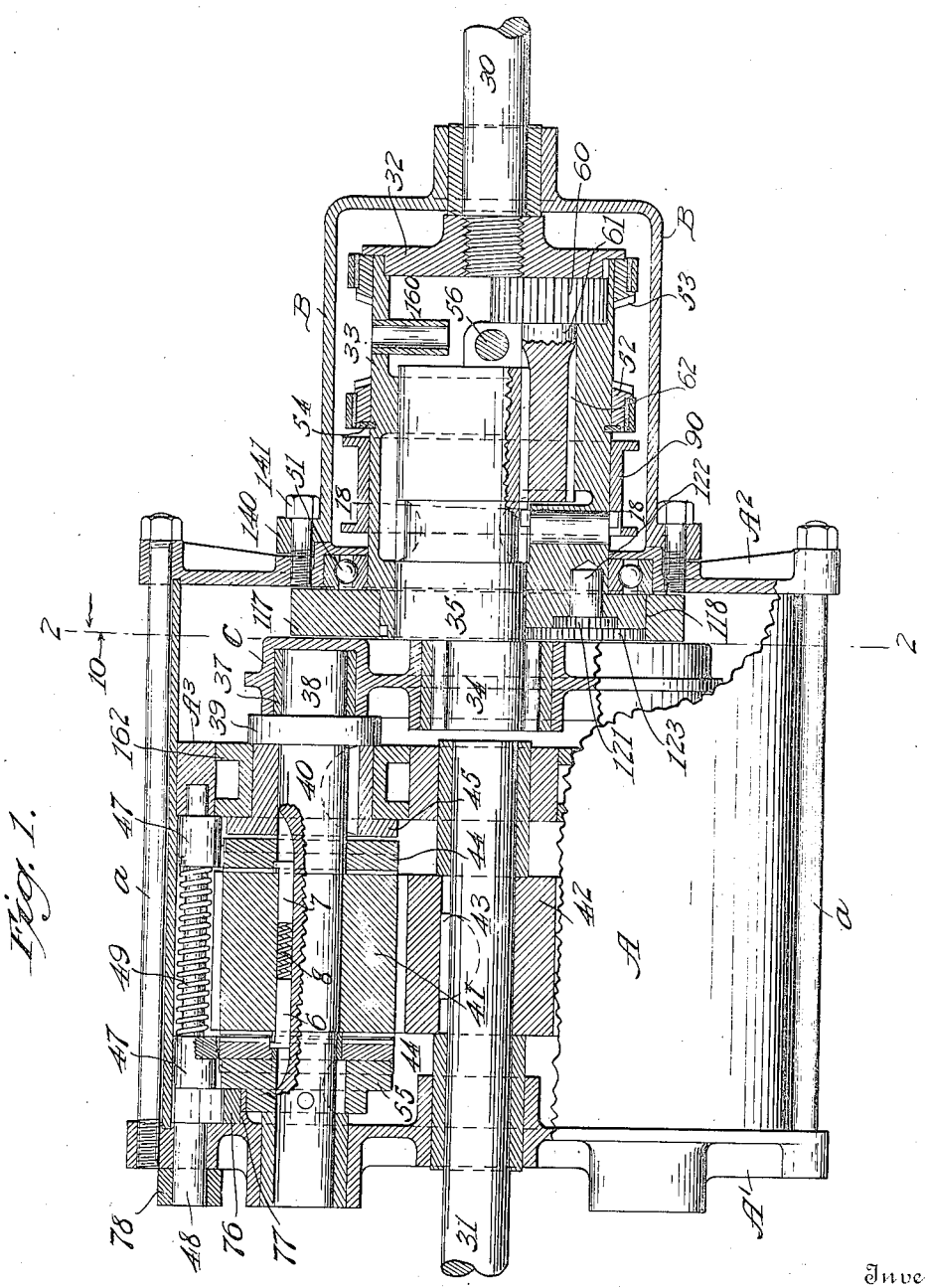

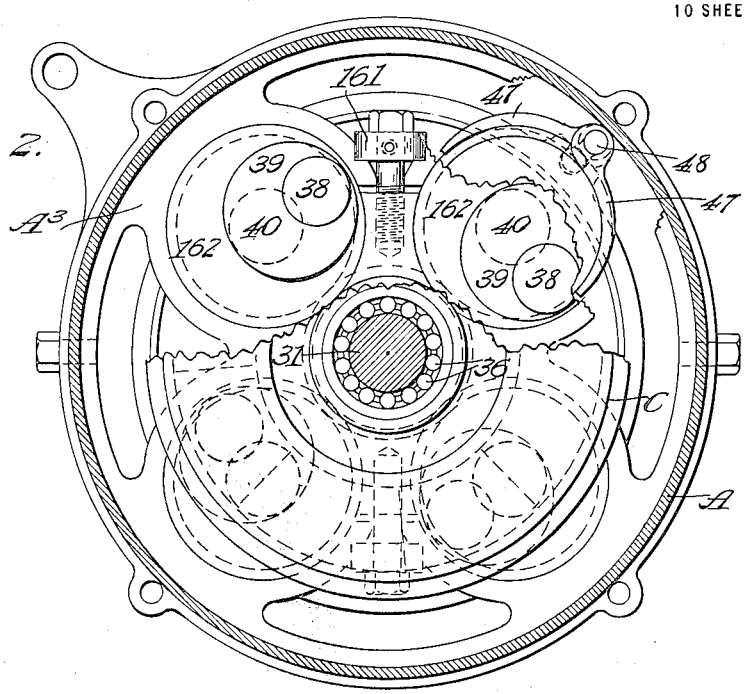
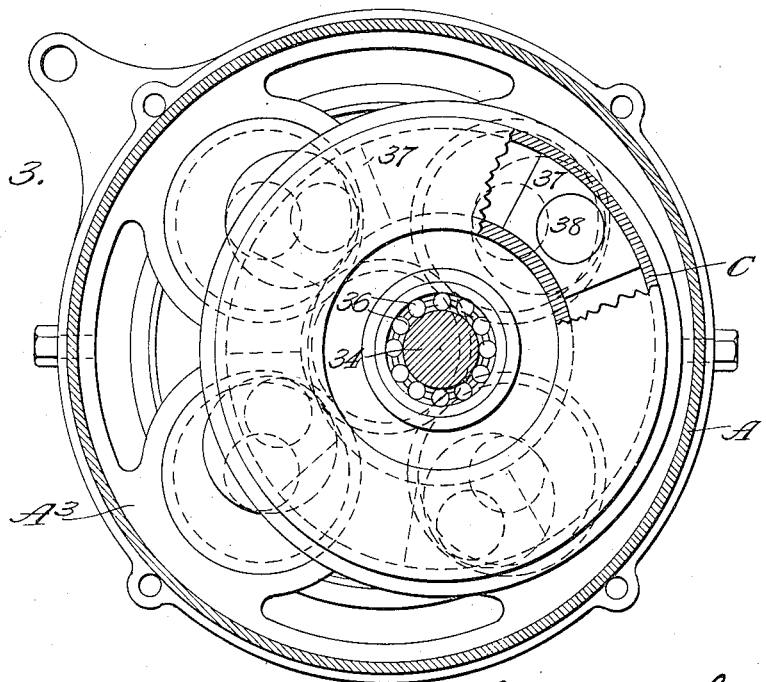

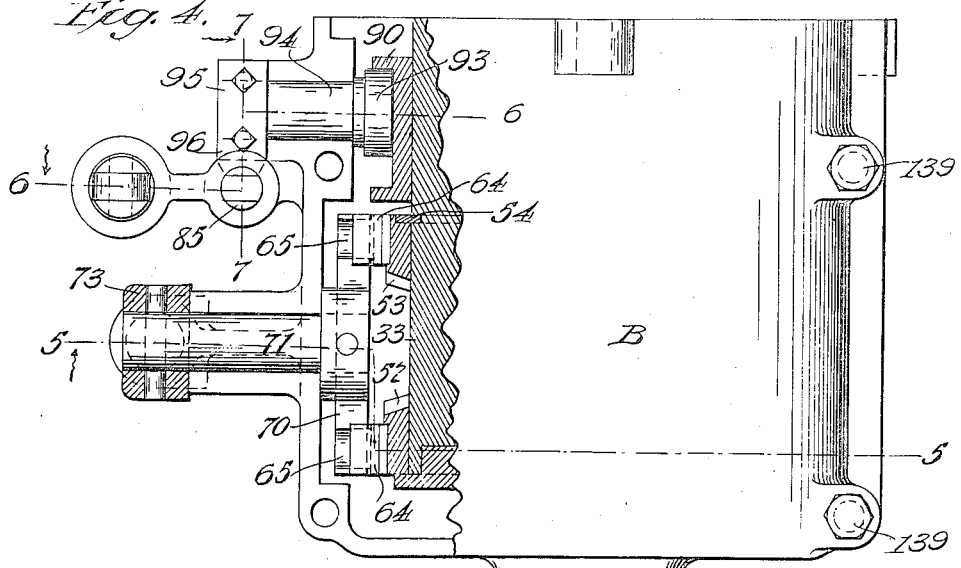

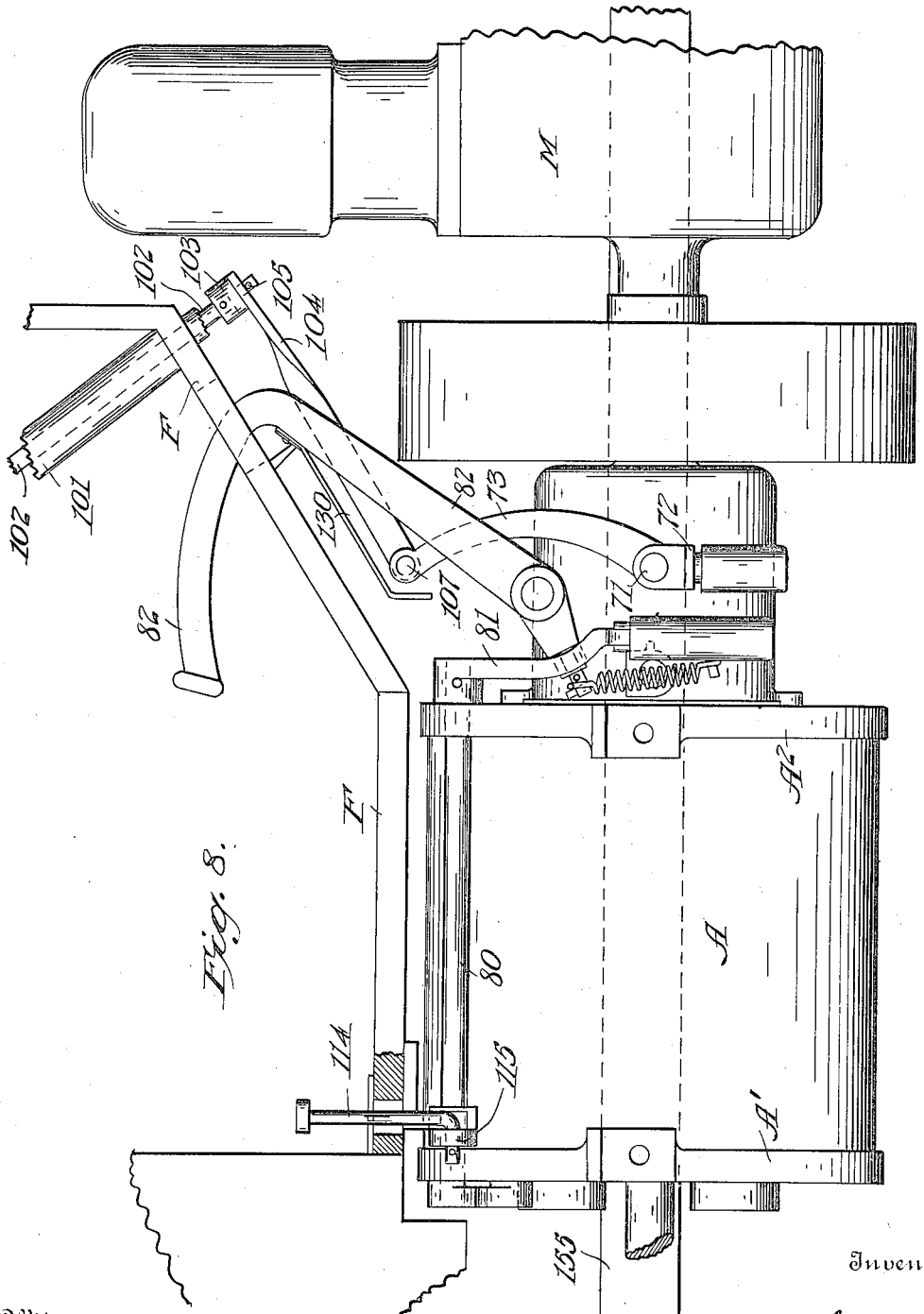

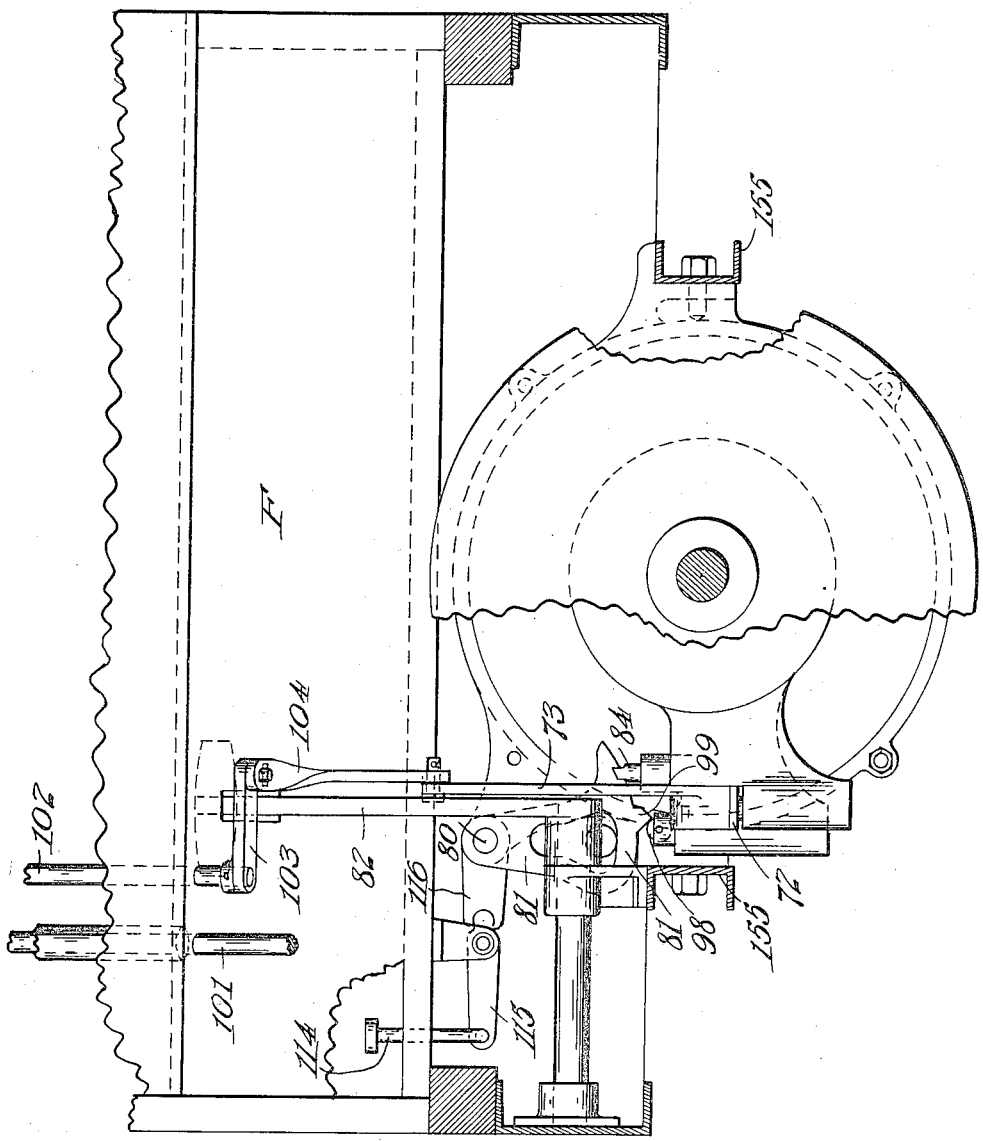

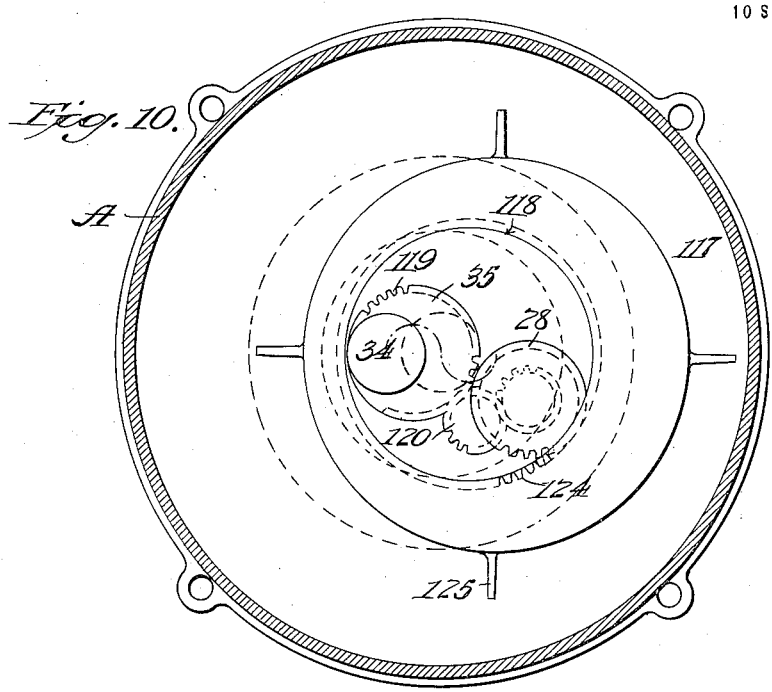

A. B. LANDIS.
CHANGE SPEED GEARING.
APPLICATION FILED JULY 23, 1912. RENEWED MAY 14, 1918.
1,289,199.
Patented Dec. 31, 1918.
10 SHEETS—SHEET 8.
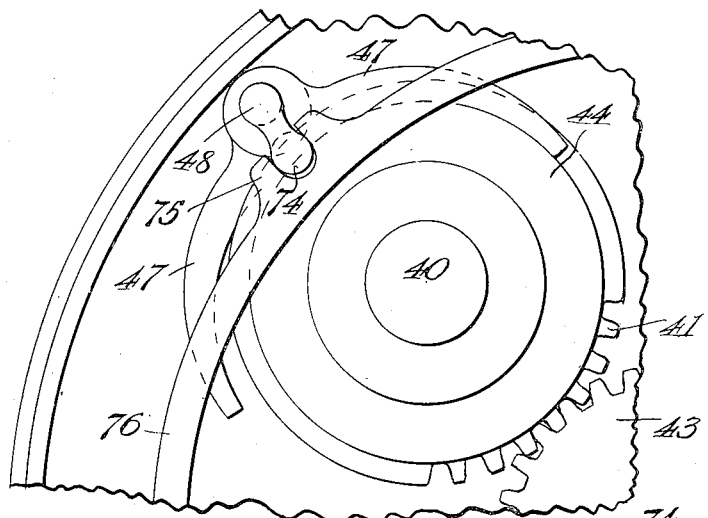
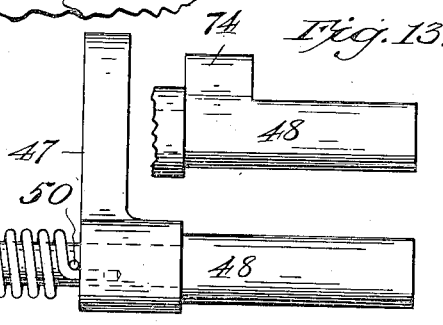
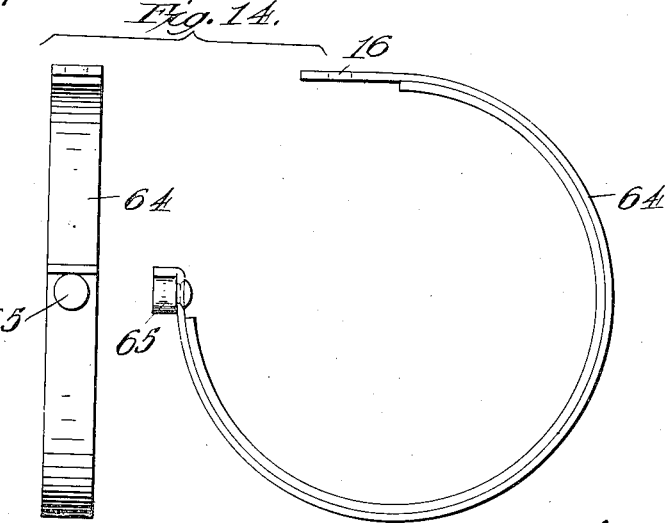
Witnesses
Inventor
Abraham B. Landis,
By Bradford & Doolittle,
Attorneys A. B. LANDIS.
CHANGE SPEED GEARING.
APPLICATION FILED JULY 23, 1912. RENEWED MAY 14, 1918.
1,289,199.
Patented Dec. 31, 1918.
10 SHEETS—SHEET 9.
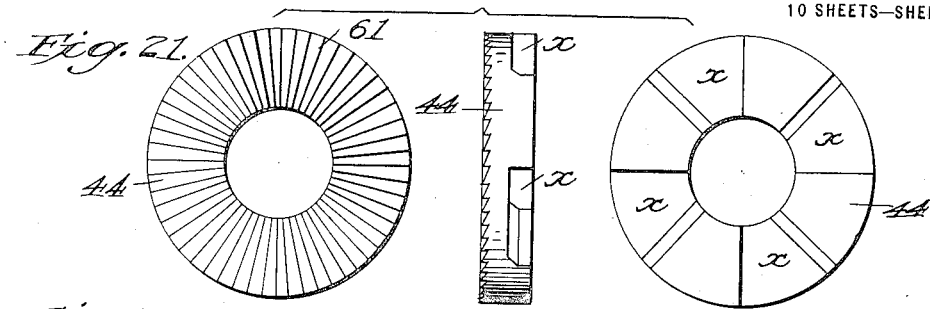
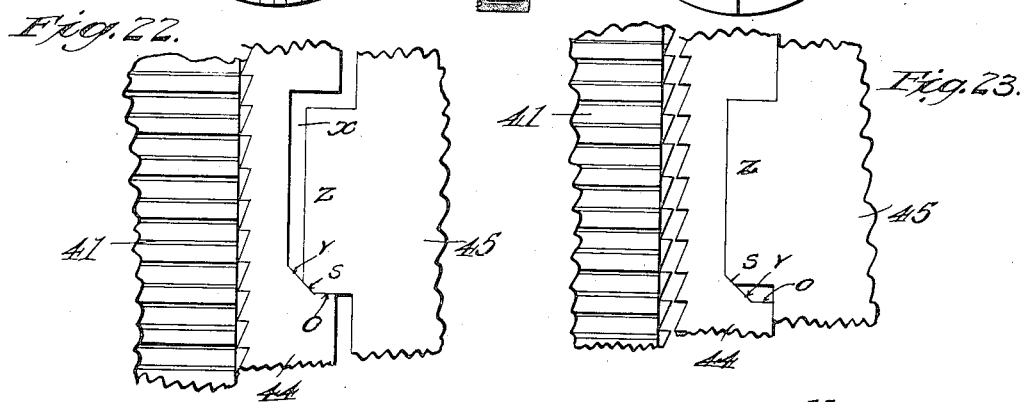
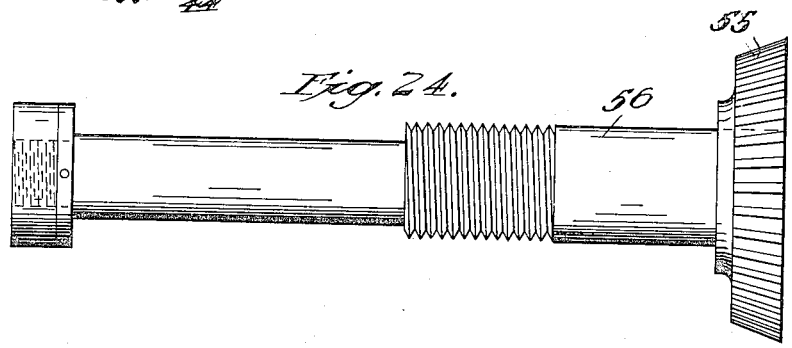
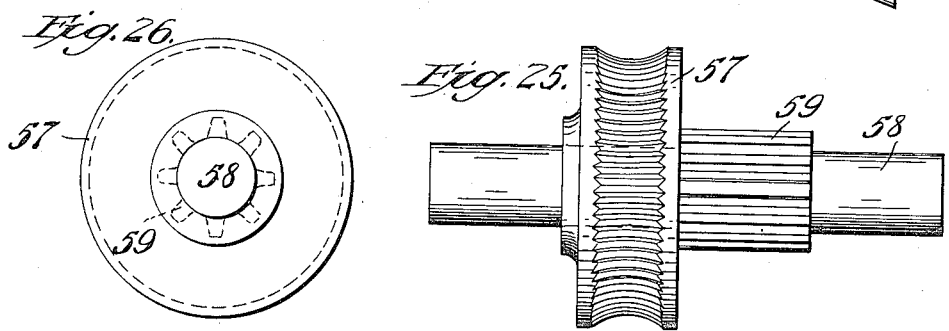

A. B. LANDIS.
CHANGE SPEED GEARING.
APPLICATION FILED JULY 23, 1912. RENEWED MAY 14, 1918.
1,289,199.
Patented Dec. 31, 1918.
10 SHEETS—SHEET 10.
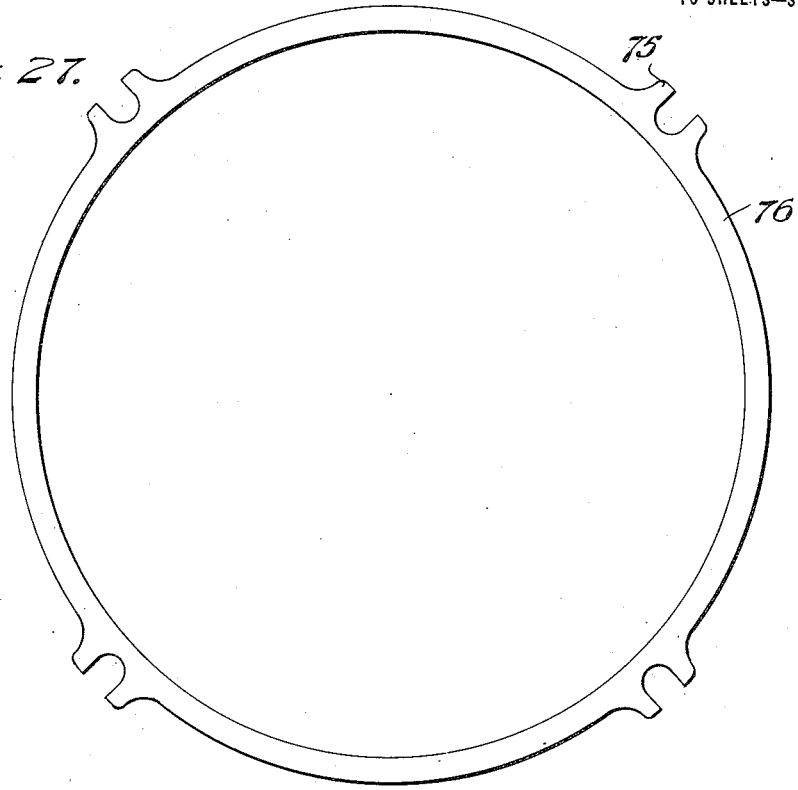
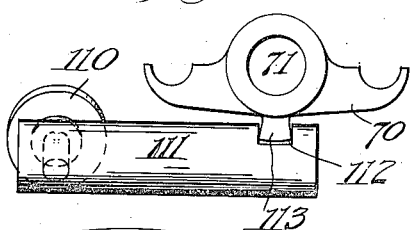
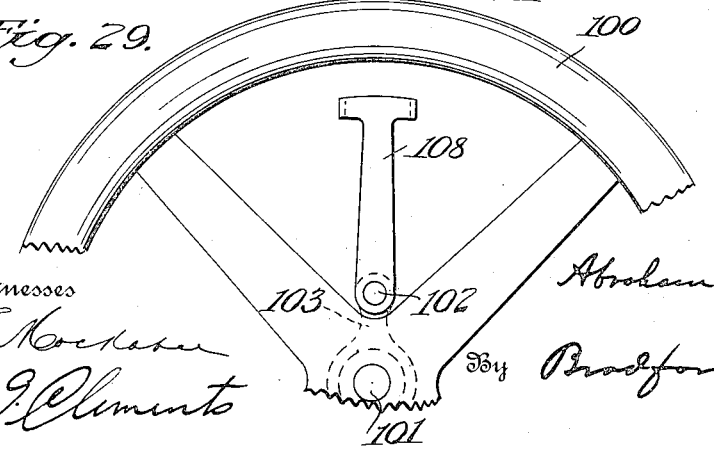

UNITED STATES PATENT OFFICE.

ABRAHAM B. LANDIS, OF ENFIELD, PENNSYLVANIA.

CHANGE-SPEED GEARING.

1,289,199.

Specification of Letters Patent. Patented Dec. 31, 1918.

Application filed July 23, 1912, Serial No. 711,041. Renewed May 14, 1918. Serial No. 234,530.

*To all whom it may concern:*

Be it known that I, ABRAHAM B. LANDIS, a citizen of the United States, residing at Enfield, Montgomery county, and State of Pennsylvania, have invented and discovered certain new and useful Improvements in Change-Speed Gearing, of which the following is a specification.

Positively driven automobile transmission gearing is commonly of the sliding gear type, the gears being slid into mesh for the several different speeds. In the use of such gearing the driven friction clutch must be disengaged while the change is being made and often the gears clash and cause a shock which is not only undesirable, but frequently breaks or injures the gearing, causing delays and consequent expense. These sudden shocks in starting by a friction drive clutch often cause the driving wheels to turn on the ground, which not only severely strains the mechanism but is very detrimental to the tires, shortening their life and adding another serious disadvantage and expense. Such a driving clutch is also subject to much wear, necessitating frequent renewal of the frictional parts with the consequent expense, and the sudden and frequent gripping of said clutch is a source of strain upon the whole car which materially shortens its life.

The object of my said invention is to provide a change speed transmission gear by which these difficulties are overcome and wherein the starting is accomplished by a gradual positive drive and the acceleration of speed made at will, with no shocks in the starting, no slipping of the wheels upon the ground, with the consequent destruction to the tires, and no unpleasant shock to the occupants of the car, while its manipulation is accomplished in a simple and easy manner.

By my said invention a transmission gearing is provided by which the speed of the driven part can be regulated, or continuously varied from zero, or no motion, to the highest speed desired, both forward and backward, the transmission of power being positive, and not frictional, which gear also includes means for stopping and starting.

Referring to the accompanying drawings, which are made a part hereof and on which similar reference characters indicate similar parts, Figure 1 is chiefly a central longitudinal cross section of the gear, the lower side of the casing being shown in elevation, and other parts being broken into to show the construction more clearly, Fig. 2 a cross section on the dotted line 2—2 in Fig. 1, with the pitman disk in concentric position and certain parts being broken into to illustrate the details more clearly, Fig. 3 a cross section on said dotted line 2—2 in Fig. 1, being a view similar to Fig. 2 with the pitman disk in eccentric position and an opening broken in one side of the pitman disk only to show one of the sliding segment blocks therein, Fig. 4 a view partly in section on the dotted line 4—4 in Fig. 5, but chiefly showing casing B in top plan, Fig. 5 a cross section on dotted line 5—5 in Fig. 4, Fig. 6 a detail view partly in elevation and partly in section on dotted line 6—6 in Fig. 4, Fig. 7 a side elevation of casing B with an opening broken therein and showing part in section on dotted line 7—7 in Fig. 4, Fig. 8 a side view of the gear as mounted on an automobile, Fig. 9 an end view showing the gear as mounted on an automobile, Fig. 10 a section as seen when looking in the direction indicated by the arrow 10 from the dotted line 2—2 in Fig. 1, showing the automatic counterbalancing arrangement, Fig. 11 a detail side view of the friction shoe clutch operating device, Fig. 12 a detail plan view of the same, Fig. 13 a detail of a part of Fig. 12 in a different position, Fig. 14 an edge view and side elevation, respectively, of the friction band brake for operating the variable speed mechanism, Fig. 15 a detail side elevation of the variable throw crank, Fig. 16 an elevation of one end thereof, Fig. 17 an elevation of its other end, Fig. 18 a section on dotted line 18—18 in Fig. 1, showing the means for limiting the variable action at its extreme, Fig. 19 a detail view of the same parts partly in section and partly in elevation, Fig. 20 another detail, as seen when looking in the direction indicated by the arrows from the dotted line 20—20 in Fig. 18, Fig. 21 a detail view showing an edge elevation and both face elevations, respectively, of the driving clutch ring, Figs. 22 and 23 details showing different positions of the clutch in operation, Fig. 24 an elevation of the "worm" shaft to drive the variating mechanism, Fig. 25 a side elevation of the "worm" wheel forming part of said mechanism, Fig. 26 an end view thereof, Fig. 27 the ring for operating the clutch operating friction shoes, Fig. 28 a detail of the releasing device for operating the brake controlling the variable mechanism, and, Fig. 29 a detail of the steering hand wheel showing its relation to the lever by which the speed variating mechanism is made operative.

In said drawings, A represents the main casing, preferably cylindrical, which is provided with heads $A^1$ and $A^2$, all held together by threaded rods $a$. Secured to the head $A^2$ of said casing A is casing B made in two parts secured together by bolts 139. Said casing B is secured to head $A^2$ by means of lugs 140 through which screws or bolts 141 extend into said head.

30 is the driving shaft which is coupled to the source of power, and 31 is the driven shaft to which the varying speed or motion is imparted by the mechanism to be described. Shaft 30 extends to within casing B, being journaled in a suitable bearing in its outer end and carries a head 32 on its inner end which is secured thereto to turn therewith and forms the outer end of a housing 33 in which crank shaft 35 is eccentrically mounted as well as the mechanism to vary the throw of the crank pin 34 on said crank shaft. Said crank pin has a pitman disk C mounted thereon, shown in section in Fig. 1 and in side elevation in Figs. 2 and 3, being preferably mounted on said pin with anti-friction rollers 36. Said pitman disk C has an annular groove in its inner face near its periphery in which are mounted segmental blocks 37 shown in Figs. 1 and 3. Said blocks are mounted on crank pins 38 on disks 39 of oscillating shafts 40. There are four of said shafts 40 arranged equidistant from each other and from the axis of driven shaft 31, each of which is mounted in bearings in heads $A^1$ and $A^3$ respectively. Said head $A^3$ is fitted within casing A an appropriate distance from its inner head $A^2$. A spur gear 41 is loosely mounted on each of said shafts 40 and meshes with a spur gear 42 secured to the driven shaft 31 by a key 43 or any suitable means. Said driven shaft 31 is journaled in suitable bearings in the head $A^1$ at one end and in the head $A^3$ at the other. Said spur gears 41 have clutch teeth on their ends which are arranged to be engaged by clutch collars 44, illustrated in detail in Fig. 21. These clutch collars are also loosely mounted on the respective shafts 40 to allow of a slight independent movement both laterally and circumferentially, being cut out, preferably at four places, forming four gaps or recesses $x$ with which corresponding lugs $z$, (Figs. 22 and 23) on collars 45, which are rigidly secured to the crank shafts 40, are adapted to engage. Said recesses and lugs are proportioned to allow for a small amount of independent circular, as well as longitudinal, movement between these parts as shown in Figs. 22 and 23. A beveled face $s$ on each lug $z$ engages with a beveled corner $v$ in corresponding gap $x$ and the forward movement of collar 45 will thus serve to force the clutch collar 44 longitudinally on shaft 40 into engagement with the clutch face on the adjacent end of spur gear 41, moving said clutch collar from the position shown in Fig. 23 to that shown in Fig. 22. During this longitudinal movement of collar 44 it has been held back under pressure of a friction shoe 47 (to be presently described) to afford sufficient resistance for the purpose, but when the clutch has been engaged the square face of the lug $z$ will bear upon the square shoulder $o$ of the gap $x$ in collar 44 and transmit power and rotary motion to said collar and through it to said spur gear 41. By this means it will be seen that the clutches are fully engaged before any load will be given to the clutch teeth and a certain engagement of the clutch is thus assured and without shock or danger of injury. It will thus be seen that the oscillation of the several crank shafts 40 by means of pitman disk C on crank pin 34 of crank shaft 35, which is mounted in housing 33 and driven by driving shaft 30, causes the clutch collars 45, rigidly secured to said oscillating crank shafts, to oscillate and when they move in one direction they will drive the spur gears 41 through the clutch faces on their ends and the clutch collars 44 and 45, and when they move in the opposite direction the parts will unclutch and move free. The unclutching is accomplished by the action of the taper of the clutch teeth in reverse motion and is also aided and the parts held unclutched by means of two small sliding blocks 6 and 7 mounted in a groove in shaft 40 with a projection at their outer ends to bear outwardly against clutch collars 44. A light spring 8 interposed between them serves to hold the said clutch collars away from the clutch faces on the ends of the spur gears when not forced inward and thus guards against accidental engagement at any time.

By this arrangement of mechanism some of said several spur gears 41 will be in constant motion in a uniform direction, transmitting power and motion to spur gear 42 and driven shaft 31, for while said clutches are disengaged, as shown in Fig. 23, during the backward movement of the oscillating crank shafts 40 on which they are mounted, they will be in driving engagement at different circumferential points in their respective forward strokes, and one clutch will always be in full speed positive driving engagement during the operation of the mechanism. The above description of the construction and arrangement of the clutch mechanism at the inner end of the oscillating crank shafts also applies to that at their outer ends except that the engaging clutch faces are formed to operate those on one end reversely to those on the other end so that when one end is in use shaft 31 will be driven in one direction and when the other end is in use its motion will be reversed.

A friction shoe 47, shown in Figs. 2, 11, and 12, is arranged to bear on each of the clutch collars 44 and retard said collars or afford resistance to their rotary motion sufficiently to cause said clutch collars to be forced in to engage with clutch faces on the spur gears 41, by the bevel faces $s$ and $v$ when the crank shaft 40 moves in the direction of driving. It will be noted by Fig. 11 that when one shoe is on to operate in one direction, the other one is off. A central position is also maintained when neither of them are operative.

Said friction shoes 47 are loosely mounted on a shaft 48 with spring 49 interposed between them, (see Fig. 12). This spring is under a circular tension and so held by pins 50 inserted in shaft 48 and engaging behind angles near the ends of said spring and on opposite sides at one end from the other. The ends of said spring enter perforations in said shoes 47 so that when turning shaft 48 in one direction one shoe 47 is brought under the tension of said spring to bear on one of the clutch collars 44, for pin 50 will move from said spring which will bring the tension of said spring to bear on said friction shoe and upon said clutch collar 44. A like operation will take place when shaft 48 is turned in the opposite direction and the other shoe will receive the tension of said spring and engage the other clutch collar. The tension of said spring 49 is sufficient to hold shoes 47 upon collars 44 with sufficient force to prevent them from rotating freely with collars 45 under the engagement maintained by spring 8, retarding their circumferential movement for a moment, or until the clutch has been engaged by inclined faces $s$ and $v$ of collars 44 and 45, as before described. Thus by turning shaft 48 appropriately the driving gear is made to operate in one or the other direction and when the said shaft is in a central position neither clutch is operating and the car will not move in either direction. In other words, the car will be stopped and this is what forms the start and stop, or clutching or unclutching mechanism.

The means for operating and controlling said shaft 48 will be described hereinafter.

The housing 33 carrying the variable throw crank pin is journaled at one end, preferably on ball bearings 51, in the head $A^2$ as shown, and at the other end is carried on the driving shaft 30 through the medium of end disk 32, said driving shaft being journaled in the outer end of casing B. On said housing are mounted two beveled gear rings 52 and 53, respectively, ring 53 being held from longitudinal movement by the head 32, and ring 52 by an adjacent inserted ring 54. Between these gear rings a bevel gear 55 is mounted on a worm shaft 56, see especially Figs. 5 and 24. Said worm shaft is mounted in appropriate bearings and extends diametrically through a transverse perforation in housing 33, being journaled in suitable bearings, as shown in Fig. 5. Said bevel gear engages with the bevel gear rings 52 and 53 and the worm on said shaft 56 engages with a worm wheel 57 on shaft 58. A pinion 59 on said shaft, alongside said worm wheel, engages a gear 60, Figs. 1 and 5, on a shaft 61 having an integral pinion 62 of some length, as shown in section in Fig. 1. Said pinion 62 meshes with the integral gear face $g$ of the crank shaft 35. This train of gearing just described serves to rotate said crank shaft 35, eccentrically mounted in housing 33, so that its crank pin 34 may either be concentric with said housing, or at "no throw," or at its full throw, or at any intermediate point. Around each of said bevel gear rings 52 and 53 is mounted a brake band 64, shown in Fig. 5 and in detail in Fig. 14. Each of said brake bands is a duplicate of the other, being lined with suitable material for the purpose and provided with a lug 65 on one end and a perforation in the other. Said perforation is for the engagement of a pin 66 carried by a screw threaded pin 67, having a nut 68 for the purpose of adjusting the fixed position of that end of said band, being adjusted as desired and then securely locked by a set-screw 69. Said bands pass around the gear rings 52 and 53, respectively, and the lugs 65 on their other ends engage with recesses in the upper edge of a double-ended rocking-head 70 on a shaft 71. See Figs. 7 and 28. The rocking of said shaft 71, as will be seen, will clamp either one or the other of said bands to the bevel gear rings, as the case may require, and when said shaft 71 is in position with rocking head 70 horizontal neither band is operative. This position is normally maintained by a spring pressed plunger 72 on the under side of operating lever 73 of shaft 71, each part being formed with a flat engaging face for this purpose, as best shown in Fig. 7.

The shaft 48 has a lug 74 on one side which engages a notch in one of four lugs 75 on a ring 76 mounted loosely on a flange 77 (Figs. 1 and 11) on head A¹. There are four of the shafts 48, one of which extends through a perforation in head A¹ to the outside and has a short bifurcated lever 78 on its outer end. Another short lever 79 with disk-shaped end engages with the bifurcation in lever 78 and is secured on a shaft 80. Said shaft 80 is journaled in both heads A¹ and A² and on its opposite end has a slotted lever 81, the slot being of the form best shown in Fig. 6 with a central upper portion having parallel sides and a lower portion, the sides of which are flared outwardly each way from said central portion. A foot lever 82, pivoted at 201 (Fig. 8) having a roller 83 on its end engages the slot of lever 81 and serves to bring said lever 81 into a central position when said foot lever has been depressed. This action brings said lever 81 central where it is locked by a spring pressed plunger 84 (Fig. 6) having an appropriately formed point 85 which engages a notch in the under edge of said lever. In this position both friction shoes 47 are disengaged from clutch collars 44, which being held free from clutch faces on gears 41, as before described, no driving action occurs in either direction.

When the crank shaft 35 is turned to a position of no throw in relation to its crank pin 34, or, in other words, when said crank pin is concentric with the housing 33, a radially projecting wing 86 mounted in a groove on one side of said crank shaft (Figs. 15 and 18) comes in contact with a projecting end 87 on one side of the center of a pin 88, which is mounted in a perforation in the housing 33, and will turn said pin slightly, and a similar projection 89 on the opposite end of said pin 88 will slightly rotate a ring 90 which is mounted on said housing. Diagonal slots 91 (preferably three) in said ring 90 engage with pins 92 secured to the housing, by which means said ring 90 is given a limited longitudinal movement thereon. A roller 93 (Fig. 6) is mounted on an eccentric pin on a shaft 94 journaled in a suitable bearing in casing B, and a collar 95 is secured on said shaft and has a lug 96 which engages a notch n in the spring pressed plunger pin 84 before referred to. In order that the operation may be accurately timed I secure collar 95 on shaft 94 to permit circumferential adjustment by means of set screws 143 which engage notches in opposite sides of said shaft. By backing one screw and advancing the other said collar may be turned as desired for a limited distance and securely held as will be readily understood. By this means, as will be seen, when the crank pin 34 on crank shaft 35 is concentric with the housing 33, there is no driving action in the gears and at this point spring pressed pin 84 is pressed down, by the mechanism just described, and unlocks the lever 81 when a spring pressed plunger 97 through a roller 98 on its upper end and a cam 99 on the under edge of said lever 81 will operate to throw said lever to the position to operate shaft 48 for making the driving clutches operative for the forward movement of the car. There will be no movement of the car, however, until the crank pin 34 on crank shaft 35 is moved to an eccentric position to cause motion, as will now be described.

The means for varying the speed has already been partly described, and I will now describe the means for operating it. In Fig. 29 a portion of a steering hand wheel 100 is shown such as is used for this purpose. Just beneath this wheel and on one side of its shaft 101 is journaled a shaft 102 which runs parallel to said shaft to a point below the foot board F and has a small hand lever 108 on its upper end convenient of reach by the operator's fingers with his hands on steering wheel 100. On the lower end of said shaft 102 is secured an arm forming a crank 103, to the outer end of which a rod 104 is coupled by a pin 105. Said rod connects with the lever 73 by a pin 107. Said lever actuates the brake bands 52 and 53, as before described, for operating the mechanism in the housing 33 to increase or decrease the stroke of the crank pin 34, and, consequently, increase or decrease the speed of the car. By pressing the lever 108 in the appropriate direction either brake desired may be brought into action and the speed quickly changed in either direction. In order to release the brake from being effective further than to the extreme position of the crank pin 34, a wing 106 in the opposite side of crank shaft 35 from wing 86 will move collar 90 longitudinally on the housing 33 as follows: Said collar engages with a roller 110 carried on a journal projecting from one side of a pin 111 mounted to slide in a suitable seat in casing B, so that the movement of said collar (Figs. 6 and 28) gives pin 111 a longitudinal movement. Said pin has a notch 112 on one side engaging a lug 113 on the under side of rocker-head 70 which is secured to shaft 71. This longitudinal movement will thus rock shaft 71, release the brake and stop the increase speed movement. In a like manner wing 86 on the opposite side of crank-shaft 35, operating through the same mechanism, slides pin 111 in the reverse direction and operates to release the other brake-band. This mechanism is thus operative in either direction so that when either extreme, the concentric position, or the full throw position, of crank pin 34 is reached the appropriate brake will be released, overcoming the pressure exerted by the fingers on the small lever 108 and stop the operation of the speed change mechanism. It will be noted when the foot lever 82 is pressed down the roller 83 on its lower end will bring lever 81 to the central position and said lever will be locked by the point 85 of spring pressed pin 84 engaging notch in the under edge of said lever. This locks the clutching mechanism out of action and stops the car in so far as any power from the engine is concerned. At the same time that said foot lever 82 is pressed a flat spring 130 secured to said lever (Fig. 8) comes into engagement with the pin 107 on the upper end of lever 73 and forces said brake lever in the direction to apply the brake which diminishes or runs down the throw of the crank to the no motion point, and through this means the mechanism operates which withdraws the spring pressed pin 84 and allows the lever 81 to return to position, under the impulse of spring pressed plunger 97 operating on cam 99, to bring the parts to position, as before described, so that the driving clutches will operate for the forward movement as soon as the variable mechanism is brought into action through the means of movement of lever 108 just described.

It will be noted that the clutches for driving the car forward are brought into ready action automatically as the variable mechanism is run down to zero. For reversing, being comparatively an infrequent motion, this operation is accomplished at will. For this purpose I preferably employ a plunger 114 which is located next to the seat. This plunger attaches to a lever 115 appropriately mounted below the foot board. The other end of lever 115 attaches to a lever 116 which is secured to the shaft 80 which operates the brake clips to operate the driving clutches, as before described.

By pressing said plunger 114 through the mechanism just described the lever 81 will be forced to the right (Fig. 6) and the cam 99 on its lower end will be thrown to the right side of the roller 98 on the spring pressed plunger 97 and there held, thereby through the connecting mechanism setting appropriate brake 64 and running up the variable mechanism and operating the car backward at any rate of speed desired. As soon as the car has moved backward as far as required the foot lever 82 is pressed, throwing the roller 83 on its lower end into the central slot which centers the clutch operating mechanism and stops its action and is automatically locked by plunger 84 and, through means of spring 130, lever 73 is moved and the variable mechanism is run down when latch pin 84 releases from notch in lever 81 and the mechanism for forward action is set, ready to be operated by lever 108.

As the change in speed is accomplished by a variable throw crank, it is evident that there will be inequilibrium, or unbalance, of the parts, which unbalance necessarily varies as the speed is raised and lowered. Such result, if not remedied, would be objectionable because of causing vibration to the car. My invention, however, includes means to completely compensate for this variation and maintain a perfect balance of the mechanism in all positions, which means will now be described.

This mechanism is best shown in Fig. 10, which is a cross section looking in the direction indicated by the arrow 10 from the dotted line 2—2 in Fig. 1, showing the crank pin 34 at its extreme throw. In this position, with the pitman disk C mounted on said crank pin, it will be obvious there would normally be considerable unbalance. To compensate for this a circular weight 117 is bored and fitted for free turning on an eccentric surface 118 of the housing 33 (see also Fig. 1). The center of this eccentric is the same distance from the center of the housing 33 as that of the crank shaft 35, but on opposite sides thereof. Gear teeth 119 are cut in said crank shaft adjoining the crank pin and a gear 120 is mounted in a recess in the end of the housing which meshes with said gear teeth 119 and also with the small gear face 121 of a compound gear mounted on a stud shaft 122 in a recess in the end of the housing, the teeth on the large gear 123 meshing with the teeth 124 on the inner surface of said balancing weight 117. Said weight and the part upon which it turns are of same weight as crank pin 34, pitman disk C and parts carried thereby. It will thus be obvious, these weights being equidistant from the center of the housing on which they are mounted and on opposite sides from each other, that they will perfectly balance in all positions, for as crank shaft 34 is rotated for less or more throw the counterweight 117 will be turned in the same direction and lessen or increase its position from center correspondingly, so that when the crank pin 34 gets to the concentric position the weight will also be concentric, hence maintaining a perfect balance in all positions of the parts and causing a smooth running of the machine without vibrations. Wings 125 are provided on weight 117 for the purpose of providing a splash system of lubrication for the interior of the gear casing. Said casing being oil-tight, a supply of oil several inches in depth, is maintained in its bottom, as is usual in engine crank cases of motor cars, and said wings, playing in said oil supply, keep all parts in said casing thoroughly lubricated.

Some of the leading characteristics of said gearing may be summed up as follows: The inequilibrium of the parts caused by making variation of speeds is automatically compensated for to avoid vibration. In starting the car, the engine is first started as usual, with no motion to the car, then the variable power actuated mechanism is brought into action by pressing an easily operated controlling lever, when the car will gradually start and increase in speed as long as the lever is pressed until the highest speed is reached, or any desired intermediate speed. Pressing the controlling lever in the opposite direction decreases the speed. The transmission may be instantly unclutched when wanting to stop the car, and the ordinary brake used on cars generally (not shown) is applied to bring the car to a halt. The unclutching action automatically sets into motion the variable mechanism and runs the gear down to zero and automatically throws in the clutch ready for starting, but the car will not then start because the variable mechanism is at zero. When wanting to start pressure on the lever 108 to move it for increased speed will gradually and without shock start the car and with an absolutely positive drive. The whole mechanism is incased within a tight inclosure and runs in oil, insuring absolute automatic lubrication to every part. The gear is secure against any accidental variation, as the variation can only be made by pressing the controlling lever in either direction according as it is to be varied. Said gear automatically runs down to zero when the drive is unclutched and until it is run down the clutch cannot be brought into engagement, thus avoiding any clutch clashing. The time required to automatically run the variable drive down to zero is but a few seconds. When wanting to run the car backward, a lever is pressed, preferably a foot lever, which sets the gearing for starting from zero to reverse, the variable feature being used the same as for going forward. When stopping this movement the same clutch lever is pressed, and by the same action the gearing is automatically set to go forward, but the car cannot be started until the variable has run down to zero, when it may be gradually started forward by pressing the lever. All of the operations are simple and performed with ease and without liability of damage to the car or any of its mechanism.

It will be obvious that this gear can readily be arranged for one direction of motion only by eliminating one set of clutches at one end of the gears 41 and one set of clutch collars and means for operating same. It is also obvious, while I employ four oscillating shafts with gears, that the results can be attained with less or more of these, as desired. Many other modifications in construction and arrangement will be obvious, all within the spirit of my invention as described and claimed.

In Fig. 8 part of a multiple cylinder motor M, such as is commonly used on automobiles, is shown to illustrate a desirable location and scheme for mounting this transmission gear on beams 155 carried by the chassis of the car, but its application may be readily made to all cars by any skilled designer or builder of cars.

I will now briefly recapitulate the operation of said invention: When standing the car always has the variable mechanism down to zero, since this is done automatically as soon as the drive is unclutched, the varying device being operated by the driving shaft which is always in motion as long as the motor is running. As before described, when the variable mechanism is run down to zero, or no motion, the clutch for forward movement is automatically thrown in, and is ready to start at any moment, by starting the mechanism which advances the movement by appropriately moving lever 108 at the hand steering wheel 100. To start the car, therefore, the engine is first started, as is usual, and then a light pressure on said lever 108 will gradually start the car without shock or slip. When the car is running the speed can be changed up and down, as desired, by said lever. When stopping the car the foot lever 82 is pressed, which immediately unclutches the power and is then locked out of action until the gear automatically runs down to zero, which will occupy only a few seconds, when it is ready to be accelerated again at will. When coasting down a hill where no power is required the car can speed ahead of the engine, if desired, and be controlled with an ordinary foot brake (not shown), as will be readily understood. When backing the car the foot plunger 114 is pressed down and the backing clutches are immediately ready for action and by pressing the lever 108 for speed acceleration the car can be moved backward at any desired speed. When the foot lever 82 is pressed to unclutch and stop the backing movement the gear is run down to zero and lever 81 moves to position for forward motion. Should the car need further backing, the foot plunger 114 is again pressed as before. Thus it will be seen that the car is under perfect control for all speeds between extremes, both backward and forward, and is manipulated with great ease and convenience without clashing of clutch, shocking of machinery, car, or occupants, and without any slipping of wheels on the ground by sudden starts and the consequent wearing out of the tires unduly.

Oscillating shafts 40 are preferably journaled in bearings 162 in head A³, the part surrounding said bearings being split and clamping screws 161 being employed to clamp said bearings in place, as shown in Fig. 2. This, however, is but a mechanical detail and forms no part of the invention.

Having thus fully described my said invention what I claim as new and desire to secure by Letters Patent is:

1. A variable speed gearing comprising a driving shaft, a driven shaft, a variable throw-crank, mechanism operatively connecting said variable throw-crank with said driving shaft, a pitman disk mounted on said crank and having an annular groove in one face, segment blocks mounted in said groove and frictionally engaging therewith, oscillating shafts connected with said segment blocks, and gearing connecting said oscillating shafts with said driven shaft, substantially as set forth.

2. A variable speed gearing comprising a driving shaft, a driven shaft, a variable throw-crank, means operatively connecting said crank with said driving shaft, oscillating shafts, gears loosely mounted thereon operatively connected with the driven shaft and having clutch teeth on their ends, clutch collars mounted to have a limited longitudinal and circumferential free movement on said oscillating shafts, means for throwing said clutch faces into engagement and operatively connecting the gears with the oscillating shafts when they move in driving direction, and means for unclutching said collars when said shafts move in the reverse direction, substantially as set forth.

3. A variable speed gearing comprising a driving shaft, a driven shaft, a housing carried by said driving shaft, a variable throw-crank mounted within said housing, gearing operatively connecting said crank and housing for varying the throw of said crank, a pitman disk on said crank, oscillating shafts, sliding parts operatively connecting said pitman disk and said oscillating shafts, and gearing connecting said oscillating shafts with said driven shaft, substantially as set forth.

4. In a variable speed gearing, a driving shaft, a housing carried thereby, a crank shaft mounted eccentrically in said housing, a gear on said crank shaft, a pinion mounted in said housing meshing with said gear, a gear wheel on the end of said pinion, a pinion meshing with said gear wheel, a worm wheel alongside said pinion, a worm engaging said worm wheel, and means for rotating said worm shaft, substantially as set forth.

5. In a variable speed gearing, a driving shaft, a housing carried thereby, a crank shaft mounted eccentrically in said housing, bevel gears mounted loosely on said housing, a worm shaft, a bevel pinion mounted on said worm shaft and engaging said gears, and gearing connecting said worm shaft to said crank shaft to rotate the latter to vary the throw of its crank, substantially as set forth.

6. In a variable speed gearing, a driving shaft, a housing carried thereby, a variable throw crank shaft mounted in said housing, bevel gears mounted around said housing, gearing connecting said gears with said crank shaft to vary its throw, and a brake engaging each of said bevel gears by which one or the other can be stopped as desired to operate the variable mechanism in the desired direction, substantially as set forth.

7. A variable speed gearing comprising a driving shaft, a housing carried thereby, a variable throw crank shaft mounted in said housing, gearing for varying the throw of the crank arranged in said housing, brakes for connecting said gearing to be actuated by power from the driving shafts, and means by which said brakes are released at the two extreme positions of said crank shaft, substantially as set forth.

8. A variable speed gearing comprising a driving shaft, a variable throw crank, means connecting said crank with oscillating shafts, loosely mounted gears thereon, a driven shaft, a gear thereon meshing with said loosely mounted gears, said gears on the oscillating shaft having clutch faces, clutch collars on said oscillating shafts arranged to have a limited independent movement, spring-pressed friction shoes bearing on said clutch collars for retarding them to throw the clutches into mesh with the clutches on the gear through operative faces on said clutch collar and their engaging collars, substantially as set forth.

9. A variable speed gearing comprising a driving shaft, a housing thereon, a variable throw crank mounted in said housing, bevel gears mounted around said housing, gearing connecting said bevel gears with said variable throw crank, brake bands on said bevel gears by which movement is imparted to said crank shaft from the driving shaft, a rocking head to which said brake bands connect, a shaft carrying the rocking head, and a lever on said shaft for rocking same, substantially as set forth.

10. A variable speed gearing comprising a driving shaft, a variable throw crank, mechanism interposed between and operatively connecting said driving shaft and said variable throw crank, a pitman disk on said crank having an annular channel on one side, segmental blocks fitting said channel, oscillating shafts the crank pins of which engage said blocks, a driven shaft, and means for transmitting motion from said oscillating shafts to said driven shaft, substantially as set forth.

11. A variable speed gearing comprising a driving shaft, a housing thereon, a variable throw crank shaft mounted in a bearing in said housing eccentric to its center, a pitman disk mounted on and carried by the pin of said crank, oscillating shafts engaging said disk, gears mounted thereon, a driven shaft, a gear on said driven shaft, clutches for engaging said gears on the oscillating shafts with said shafts, and means for effecting and controlling said engagement, substantially as set forth.

12. A variable speed gearing comprising a driving element, a driven element, a variable throw-crank operatively connected with the driven element, means for adjusting said crank to vary its throw, said means comprising two gear wheels on said driving element, brake-bands thereon for holding alternately one or the other whereby said variation of crank throw is made operative, a rocking head mounted on a shaft engaging said brake-bands, and means for rocking said shaft carrying said head to bring into action either of the brake-bands at will, substantially as set forth.

13. In a variable speed gearing, the combination of a casing, a driving shaft, a driven shaft, a housing carried by said driving shaft to rotate therewith, a crank-shaft eccentrically mounted in said housing, gearing for varying the throw of said crank-shaft, brake-bands for controlling the operation of said gearing, means for releasing said brake-bands at each extreme position of said crank-shaft and limiting the operation of said gearing, and a train of gearing connecting said crank-shaft with said driven shaft, substantially as set forth.

14. In a variable speed gearing, the combination of a casing, a driving shaft, a driven shaft, a housing carried by said driving shaft to rotate therewith, a crank-shaft eccentrically mounted in said housing, gearing for varying the throw of the crank of said crank-shaft, means including brake-bands for operating and controlling said gearing, a trip mechanism for automatically disengaging said brake-bands at each extreme position of said crank, and a train of gearing operatively connecting said crank-shaft with said driven shaft, substantially as set forth.

15. In a variable speed gearing the combination of a casing, a driving shaft, a driven shaft, a housing carried by said driving shaft, a crank shaft eccentrically mounted in said housing, gearing connected with said crank shaft for rotating the same in its bearings to vary its throw, means for operating said gearing, means for normally holding said operating means inactive, means for operating said gear in either direction at will, a train of gearing connecting said crank shaft with said driven shaft comprising clutch mechanism, means for operating said clutch mechanism, and a connection between said means for operating said clutch mechanism and the means for operating said variable throw mechanism whereby when said clutch mechanism is rendered inoperative said variable throw mechanism is operated to turn said crank shaft to the "no throw" position, substantially as set forth.

16. A variable speed gearing comprising a casing, a driving shaft, a driven shaft, a crank shaft carried in eccentric bearings by said driving shaft, gearing for varying the throw of said crank shaft, a train of gearing operatively connecting said crank shaft with said driven shaft embodying clutch mechanism, means for operating said clutch mechanism, means for operating said variable throw gearing, and a connection whereby the operation of the clutch mechanism also operates said variable throw mechanism to turn the crank shaft to a position concentric with said driving shaft, substantially as set forth.

17. A variable speed gearing comprising a casing, a driving shaft, a driven shaft, a crank shaft eccentrically mounted on said driving shaft, means for varying the throw of said crank shaft in either direction, means for normally holding it in a fixed adjustment, a train of gearing operatively connecting said crank shaft with the driven shaft, and means for rendering said train of gearing inoperative, said means being also connected to operate the means for varying the throw of said crank shaft, substantially as set forth.

18. A variable speed gearing comprising a casing, a driving shaft, a driven shaft, a crank shaft carried by said driving shaft, a series of oscillating shafts geared to said driven shaft through clutch mechanism, pitmen connecting said crank shaft to said oscillating shafts for operating them, and means for rendering said clutch mechanism operative or inoperative at will, substantially as set forth.

19. A variable speed gearing comprising a casing, a driving shaft, a driven shaft, a variable throw crank carried by said driving shaft, means for varying the throw of said crank, a gear mounted on said driven shaft, a series of oscillating shafts surrounding said driven shaft, gears loosely mounted on said oscillating shafts and meshing with the gear on said driven shaft, a compound pitman operatively connecting said crank shaft with said oscillating shafts, clutch parts carried by said oscillating shafts, other clutch parts carried by said loosely mounted gears, and means for throwing said clutch mechanism into and out of operative engagement, substantially as set forth.

20. A variable speed gearing comprising a casing, a driving shaft, a driven shaft, a crank shaft operatively carried by said driving shaft, oscillating shafts journaled in bearings surrounding said driven shaft, a gear on said driven shaft, loosely mounted gears on said oscillating shafts connected therewith, said loosely mounted gears being formed with reversely positioned clutch faces on their opposite ends, clutch parts carried by said oscillating shafts and adapted to engage with said clutch faces, means for throwing the clutch into and out of engagement at either end of said gears, and a compound pitman operatively connecting said crank shaft with said oscillating shafts, substantially as set forth.

21. A variable speed gearing comprising a casing, a driving shaft, a driven shaft, a crank shaft carried by said driving shaft, oscillating shafts journaled adjacent to said driven shaft, a pitman operatively connecting said crank shaft and said oscillating shafts, gears connecting said oscillating shafts and said driven shaft, clutches for controlling the operation of said gears embodying clutch collars interposed between the two main clutch faces and adapted to have a limited independent movement, and means for clutching and unclutching said clutch collars with said gears, substantially as set forth.

22. In a variable speed gearing the combination of a casing, a driving shaft, a driven shaft, a crank shaft carried by said driving shaft, oscillating shafts, a compound pitman operatively connecting said crank shafts with said oscillating shafts, a spur gear secured to said driven shaft, spur gears loosely mounted on said oscillating shafts and meshing with spur gears on said driven shaft, said loosely mounted gears being formed with reversely cut clutch faces on their opposite ends, collars fast on said oscillating shafts, clutch collars interposed between said fast collars and the ends of said loosely mounted gears, said interposed collars being connected with said fast collars to have a limited independent circular and longitudinal movement and formed with clutch faces adjacent to the ends of said gears, means for normally holding said clutch collars out of engagement with said gears, and means for throwing either one or the other of said clutch collars into engagement to secure the direction of motion desired, substantially as set forth.

23. A variable speed gearing comprising a casing, a driving shaft, a driven shaft, and a train of gearing operatively connecting said driving shaft and said driven shaft, said train of gearing embodying a clutch for coupling and uncoupling the driving relation of said gearing, said clutch including a clutch collar interposed between the two main clutch parts thereof and mounted to have a limited independent circular and longitudinal movement, whereby said clutch may become fully engaged before receiving the load, substantially as set forth.

24. A variable speed gearing comprising a casing, a driving shaft, a driven shaft, a train of gearing connecting said driving shaft with said driven shaft embodying a clutch, said clutch embodying an interposed clutch ring connected to a fixed part to have a limited independent circular and longitudinal movement, tapered bearing faces between said fixed part and said interposed part, means for normally holding said interposed part out of engagement with the opposed clutch face, and means for retarding the movement of said interposed part, whereby said tapered faces become operative and throw it into engagement with the opposed clutch face, substantially as set forth.

25. In a variable speed gearing the combination of a casing, a driving shaft, a driven shaft, a train of gearing connecting said driving shaft with said driven shaft comprising a clutch, one clutch face being on a loosely mounted part and the other on a part interposed between a fixed collar and said loosely mounted part, said interposed part being connected with said fixed collar to have a limited independent circular and longitudinal movement, means for normally holding said interposed part away from the other clutch part, tapered faces being formed in the connection between said interposed part and said fixed collar for operating said interposed part longitudinally when the same is retarded in its rotary movement, and a friction shoe adapted to operate upon said interposed part for retarding its rotary movement, substantially as set forth.

26. In a variable speed gearing, the combination of a casing, a driving shaft, a driven shaft, a variable throw crank shaft carried by said driving shaft, means for varying the throw of said crank shaft, oscillating shafts, a compound pitman connecting said crank shaft with said oscillating shafts, a gear fixed on said driven shaft, corresponding gears loosely mounted on said oscillating shafts and meshing with said gear on said driven shaft, said loosely mounted gears being provided with reversely positioned clutch faces on their opposite ends, collars fast on the adjacent ends of said oscillating shafts, clutch collars interposed between said fast collars and the ends of said loosely mounted gears formed with clutch faces on their faces adjacent to the ends of said gears, said interposed clutch collars and said fast collars being connected by interlocking lugs and recesses, said recesses being somewhat longer than said lugs and formed with engaging tapered faces on their forward corners whereby said interposed collars may have a limited independent circular and longitudinal movement when held from rotation, and friction shoes adapted to engage the periphery of either one or the other of said collars as desired, whereby said loosely mounted gears are locked to said oscillating shafts to operate in either direction desired, substantially as set forth.

27. A variable speed gearing comprising a casing, a driving shaft, a driven shaft, a crank shaft eccentrically mounted in bearings carried by said driving shaft, a pitman operatively connecting said crank shaft to gearing for driving said driven shaft, means for varying the throw of said crank shaft, and a counterbalanced weight mounted around the bearing of said crank shaft and geared thereto to rotate as said crank shaft is rotated, whereby the parts are maintained at equilibrium around the axis of said driving shaft, substantially as set forth.

28. A variable speed gearing comprising a casing, a driving shaft, a driven shaft, a housing carried by said driving shaft, a crank shaft eccentrically mounted in said housing, a ring mounted on said housing around the bearing for said crank shaft one side of which is weighted to counterbalance the weight of the crank pin and the parts carried thereby, gearing connecting said weighted ring with said crank shaft whereby as the throw of said crank is varied said ring will be turned to maintain the equilibrium of the parts, and gearing operatively connecting said crank shaft with said driven shaft, substantially as set forth.

29. A variable speed gearing comprising a casing, a driving shaft, a driven shaft, a train of gearing connecting said driving shaft with said driven shaft, a clutch mechanism interposed in said train of gearing, whereby the driving connection may be coupled or uncoupled, said clutch mechanism embodying a clutch element interposed between the two main clutch faces and arranged to have a limited independent movement both in a longitudinal and rotary direction, substantially as set forth.

30. In a variable speed gearing the combination of a driving shaft, a driven shaft, and a train of gearing between them comprising two clutches reversely arranged and each including a ring interposed between the fast part and the loose part of each clutch and mounted to have a limited movement independent of said fast part to permit its engagement before receiving the load, friction shoes for engaging said rings, means for normally holding said shoes out of engagement, and means for throwing either one or the other into engagement, substantially as set forth.

31. In a variable speed gearing the combination of a casing, a driving shaft, a driven shaft, and a train of variable speed gearing connecting said driving shaft with said driven shaft which embodies a clutch, said clutch, comprising a part connected with the driving part to have a limited independent movement therefrom, and means for moving said part to engage the driven part before receiving the load, substantially as set forth.

In witness whereof, I have hereunto set my hand and seal at Washington, District of Columbia, this fifteenth day of July, A. D. nineteen hundred and twelve.

ABRAHAM B. LANDIS. [L. S.]

Witnesses:
E. W. BRADFORD,
E. G. CLEMENTS.